United States Patent [19]

Sasaki et al.

[11] Patent Number: 4,578,868

[45] Date of Patent: Apr. 1, 1986

[54] DIGITAL DISPLAY MEASURING APPARATUS

[75] Inventors: Kohji Sasaki; Yoshihiro Arai; Yasuyuki Yamaguchi; Toshiyuki Matsumoto, all of Kanagawa, Japan

[73] Assignee: Mitutoyo Mfg. Co., Ltd., Tokyo, Japan

[21] Appl. No.: 595,248

[22] Filed: Mar. 30, 1984

[30] Foreign Application Priority Data

Apr. 1, 1983 [JP] Japan .................................. 58-57054
Apr. 7, 1983 [JP] Japan .................................. 58-61431

[51] Int. Cl.⁴ .............................................. G01B 3/18
[52] U.S. Cl. .................................................. 33/166
[58] Field of Search ............. 33/1 PT, 143 L, 147 N, 33/166, 170, 172 E

[56] References Cited

U.S. PATENT DOCUMENTS

| | | | |
|---|---|---|---|
| 4,218,823 | 8/1980 | Matsumoto et al. | 33/166 |
| 4,443,945 | 4/1984 | Takemura et al. | 33/166 |
| 4,486,891 | 12/1984 | Kimoto et al. | 33/166 |

FOREIGN PATENT DOCUMENTS

| | | | |
|---|---|---|---|
| 44823 | 1/1982 | European Pat. Off. | 33/166 |
| 2937248 | 6/1980 | Fed. Rep. of Germany | 33/1 PT |
| 1359029 | 3/1964 | France | 33/166 |
| 153263 | 9/1982 | Japan | 33/1 PT |
| 2022267 | 12/1979 | United Kingdom | 33/1 PT |
| 2027880 | 2/1980 | United Kingdom | 33/166 |

*Primary Examiner*—Richard R. Stearns
*Attorney, Agent, or Firm*—Koda and Androlia

[57] ABSTRACT

A digital display measuring system includes a movable and stationary members between which an object to be measured is located, these members respectively supporting transmitter and receiver electrodes which define a variable capacitor having its electrostatic capacity which is adapted to change as the movable member is displaced relative to the stationary member. The change of electrostatic capacity is detected and converted into an electrical signal which is digitally indicated on a display to show the mechanical displacement of the movable member.

4 Claims, 7 Drawing Figures

DIGITAL DISPLAY MEASURING APPARATUS

BACKGROUND OF THE INVENTION

1. Field of the Invention

The present invention relates to a digital display measuring apparatus, and particularly to such a measuring apparatus including an electrostatic type encoder.

2. Prior Art

There is well known a measuring system for digitally displaying measurements. The digital display measuring system can eliminate any personal error upon reading and quickly read measurements. Therefore, such a type of measuring systems have currently been utilized in various different fields of industry.

In general, the digital display measuring system comprises a measuring element movable on the system body and adapted to contact an object to be measured, an encoder for detecting the movement of the measuring element and converting it into an electrical signal pulse, a counter circuit for counting the electrical signal pulse from the encoder, and a digital display for digitally indicating the counted value from the counter circuit. Thus, the measurement can instantly be read.

The known encoder used in this type of measuring systems includes photoelectric type encoders, contact type encoders, electrostatic type encoders and others.

The photoelectric type encoder comprises a rotary disc including slits formed therein and spaced away from one another at regular intervals, and light emitting and receiving elements between which the disc is disposed and which form an optical path through the slits on the rotary disc. The rotary disc is adapted to rotate depending on the displacement of the measuring element. As the disc is rotated, it intermittently blocks the optical path so that the displacment of the measuring element will be detected.

In the photoelectric type encoder, however, the light emitting element consumes an increased amount of power. If the system is supplied with its power from a battery, the battery must frequently be replaced by a new battery. Also, if a battery having its larger capacity is used in the system, the entire system will be increased in size. When it is desired to improve the accuracy of measurement, a great number of slits must be formed in the rotary disc several microns apart. This is difficult to manufacture and yet tends to provide errors due to changes in clearance during operation.

The contact encoder utilizes a slit, a brush and others on detecting of the displacement of the measuring element. The slit and brush are violently worn. Also, the measurement signal frequently contains a noise.

On the contrary, the electrostatic type encoder provides a power consumption less than that of the photoelectric type encoder and also has no problem with respect to the brush, slit and others which are violently worn and provide noises as in the contact type encoder. Therefore, the electrostatic type encoders have broadly been utilized in various digital display measuring systems.

In the conventional digital display measurement systems, the electrostatic type encoder comprises at least a pair of electrode plates positioned faced to each other to form a capacitor. These electrode plates are adapted to move relative to each other depending on the displacement of the measuring element. This relative displacement between the electrode plates is converted into the change of electrostatic capacity in the capacitor which is in turn detected electrically.

For example, a plurality of electrode plates having one polarity are arranged side-by-side on a main scale at regular intervals. The main scale is disposed parallel to and spaced away from an index scale on which a single electrode plate having the other polarity is positioned. One of the main and index scales is adapted to move depending on the displacement of the measuring element. On the relative displacement of the scales, therefore the capacitor defined by the electrodes will be changed in capacity. This is electrically detected as a displacement in the measuring element.

In the conventional arrangement of the electrostatic type encoder, the capacitor defined by the electrodes is utilized to define a voltage dividing circuit which is adapted to detect a ratio of divided voltages varying depending on the change of electrostatic capacity in the capacitor. This detected ratio is used to know the displacement of the measuring element. Where the distance between the electrode plates defining the capacitor for any other reason or where the voltage applied to the voltage dividing circuit is changed, the output of the dividing circuit will not accurately indicate the displacement of the measuring element.

SUMMARY OF THE INVENTION

It is therefore an object of the present invention to provide a digital display measuring apparatus which can accurately indicate measurements.

Another object of the present invention is to provide the above type measuring apparatus which can easily be reduced in size.

In one aspect, the present invention provides a digital display measuring apparatus comprising a movable measurement element adapted to engage an object to be measured and an encoder for detecting the displacement of the measurement element and converting it into an electrical output signal which is digitally indicated in a display, the measuring apparatus being characterized in that said encoder comprises a stationary plate on the base of the system, a rotary plate positioned opposed to the stationary plate and adapted to rotate depending on the displacement of the measuring element, a plurality of transmitter electrodes disposed circumferentially on the stationary plate at regular intervals, a ring-shaped receiver electrode located on the stationary plate concentrically with the circle arrangement of the transmitter electrodes, coupling electrodes located on the rotary plate in such a manner that the coupling electrodes straddle and are spaced away from the transmitter and receiver electrodes, said coupling electrodes electrostatically connecting the transmitter and receiver electrodes with each other, and earthing electrodes disposed on the rotary plate in such a manner that the earthing electrodes straddle and are spaced away from the transmitter and receiver electrodes, the coupling and earthing electrodes being alternately disposed circumferentially on the rotary plate, whereby the displacement of the measuring element can be detected in accordance with an output signal of the receiver electrode varied by the rotation of the rotary plate when AC voltages having different phases are applied to the respective transmitter electrodes.

In another aspect, the present invention provides a digital display micrometer comprising a spindle movable on the micrometer body and adapted to engage an object to be measured, and an encoder for detecting the displacement of the spindle and converting it into an electrical output signal which is digitally indicated on a display, the micrometer being characterized in that said encoder comprises a stationary cylinder on the base of the apparatus, a rotating member fitted into or over the stationary cylinder and spaced away from the internal or external wall of the stationary cylinder, said rotating member being adapted to rotate in response to the movement of the spindle, a plurality of transmitter electrodes located on one of the opposing walls of the stationary cylinder and rotating member and spaced away from one another at regular intervals, a belt-like receiver electrode disposed on said one wall parallel to the train of said transmitter electrodes, coupling electrodes on the other wall in such a manner that the coupling electrodes straddle and are spaced away from the transmitter and receiver electrodes, said coupling electrodes electrostatically connecting the transmitter electrodes with the receiver electrode, and earthing electrodes on the other wall in such a manner that the earthing electrodes straddle and are spaced away from the transmitter and receiver electrodes, said coupling and earthing electrodes being alternately arranged circumferentially on the other wall, whereby the displacement of said spindle can be detected in accordance with the output signal of the receiver electrode varying in response to the rotation of the rotating member when AC voltages having different phases are applied to the respective transmitter electrodes.

BRIEF DESCRIPTION OF THE DRAWINGS

FIG. 5 is an exploded view showing a rotating member and stationary cylinder which are used in the micrometer shown in FIG. 4; and.

DETAILED DESCRIPTION OF THE INVENTION

Figure 1:
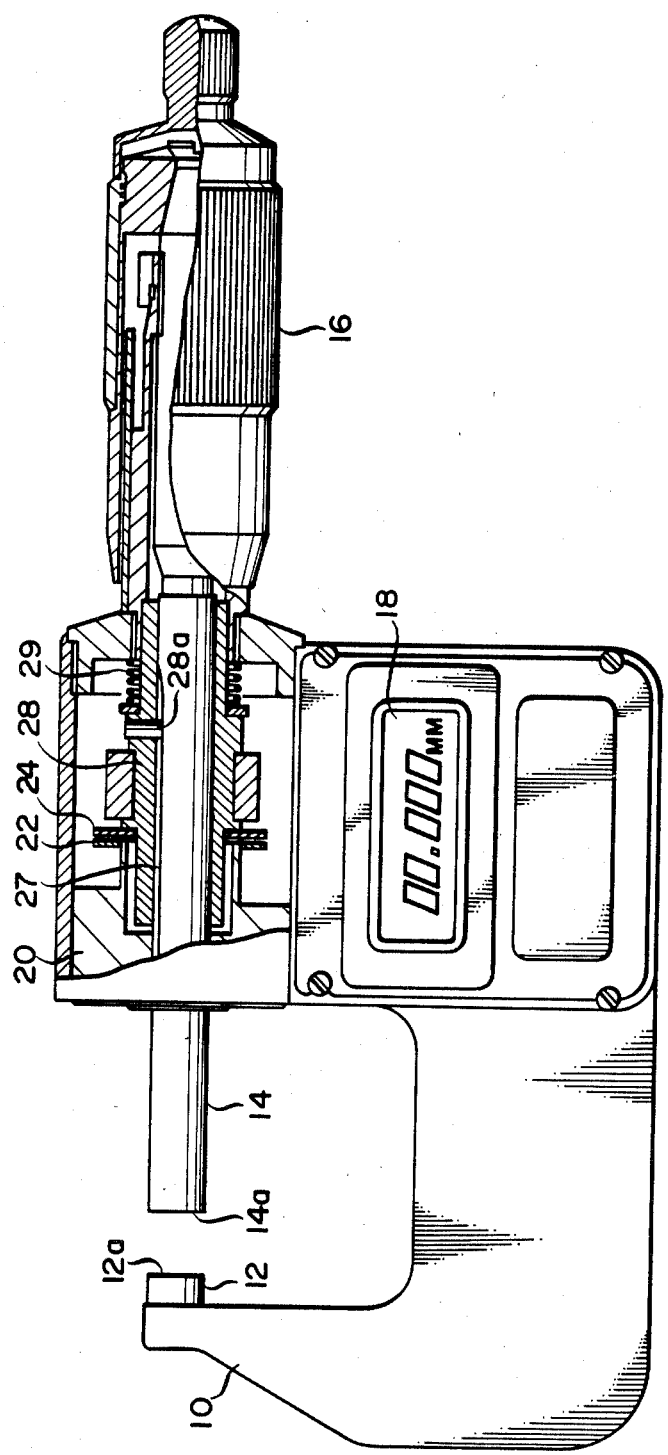
FIG. 1 is a side view showing, partially broken, a digital display micrometer to which the principle of the present invention is applied.

Referring now to FIG. 1, there is shown a digital display micrometer constructed in accordance with the present invention, which comprises a U-shaped frame 10, an anvil 12 mounted on the frame 10 at one leg of the U-shape with the measuring face 12a being faced to the other leg, and a spindle 14 mounted on the frame 10 at the other leg with the measuring face 14a being faced to the measuring face 12a of the anvil 12, the spindle 14 serving as a measuring element. The spindle 14 is formed integrally with a thimble 16 which is manually rotated to move the spindle 14 toward and away from the anvil 12.

In the embodiment of FIG. 1, the mechanical displacement of the spindle 14 is detected and converted into an electrical signal pulse by the use of an encoder. The electrical signal is supplied to a counter circuit which is adapted to count the electrical output signal from the encoder with the counted value being digitally indicated on a digital display 18 at the side of the frame 10. Thus, the accurate size of an object located between the measuring faces 12a, 14a of the anvil and spindle 12, 14 can digitally be indicated on the display 18.

In one aspect of the present invention, the above encoder is in the form of an electrostatic type encoder having a certain preferred structure of electrode. Therefore, the mechanical displacement of the spindle 14, which is a measuring element, can simply and precisely be measured.

For such a purpose, the encoder includes a stationary plate 22 located on a base 20 of the micrometer, and a rotary plate 24 positioned opposed to the stationary plate 22 and adapted to rotate in response to the movement of the measuring element.

Figure 2A:
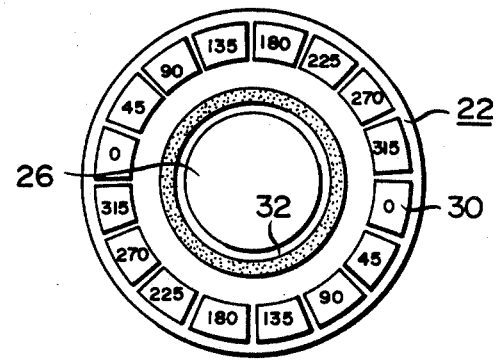
FIGS. 2 (A) AND 2 (B) are a front elevational view showing a rotary and stationary plates used in the micrometer according to the present invention.
Figure 2B:
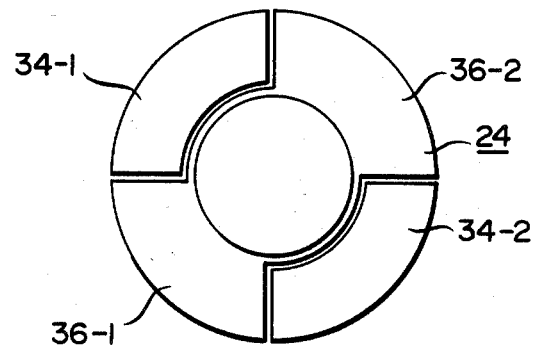

FIG. 2 shows a preferred embodiment of the present invention with respect to the stationary and rotary plates 22 and 24. The stationary plate 22 is in the form of an annulus having a central opening 26 through which the spindle 14 is mounted on the base 20.

The rotary plate 24 also is in the form of an annulus which is rotatably mounted on a rotating cylinder 28 located around the spindle 14 and spaced away from the stationary plate 22.

The rotating cylinder 28 includes an abutment pin 28a inwardly extending from the inner wall thereof and which engages a key groove 27 formed on the outer periphery of the spindle 14 along the length thereof. The rotating cylinder 28 is biased toward the tip of the spindle 14 along the length thereof by means of a bias spring 29.

When the thimble 16 is manually rotated to move the spindle 14 toward and away from the anvil 12 while rotating the spindle 14, the engagement of the pin 28a with the key groove 27 causes the rotating cylinder 28 to rotate while moving this cylinder toward the tip of the spindle 14. Thus, the displacement of the spindle 14 causes the rotary plate 24 to rotate relative to the stationary plate 22 while maintaining a predetermined clearance between the rotary and stationary plates 24 and 22.

The stationary plate 22 is provided with a plurality of transmitter electrodes 30 disposed circumferentially at regular intervals and a ring-like receiver electrode 32 arranged concentrically with the circular train of the transmitter electrodes 30. The rotary plate 24 includes coupling electrodes 34 straddling and being spaced away from the transmitter and receiver electrodes 30, 32. Each of the coupling electrodes 34 electrostatically connects the corresponding transmitter electrodes with the receiver electrode 32. The rotary plate 24 also includes earthing electrodes 36 straddling and being spaced away from the transmitter and receiver electrodes 30, 32. The coupling and earthing electrodes 34, 36 are alternately arranged circumferentially on the rotary plate 24.

In the above arrangement, if the rotary plate 24 is rotated under such a state that AC voltages having different phases are applied to the respective transmitter electrodes 30, the receiver electrode 32 will generate its output signal having a phase corresponding to the rotational displacement of the rotary plate 24.

Comparing the output signal phase of the receiver electrode 32 with a reference phase, therefore, the displacement of the measuring element or spindle 14 can accurately be measured without influence due to change of power voltage or the like.

In the illustrated embodiment, the transmitter electrodes 30 are shown to be two groups each including eight transmitter electrodes arranged circumferentially on the stationary plate 22. The receiver electrode 32 is shown to be arranged concentrically inside the circular train of the transmitter electrodes 30. AC voltages which are respectively out of phase by 45° are applied to the respective transmitter electrodes 30 in each group. The coupling and earthing electrodes 34-1, 34-2, 36-1, 36-2 are alternately disposed circumferentially on the rotary plate 24 as seen clearly from FIG. 2. Each of the coupling and earthing electrodes 34, 36 covers a quarter of the circumference of the stationary plate 22 which includes four of the transmitter electrodes 30 and a quarter of the ring-like receiver electrode 32.

Figure 3:
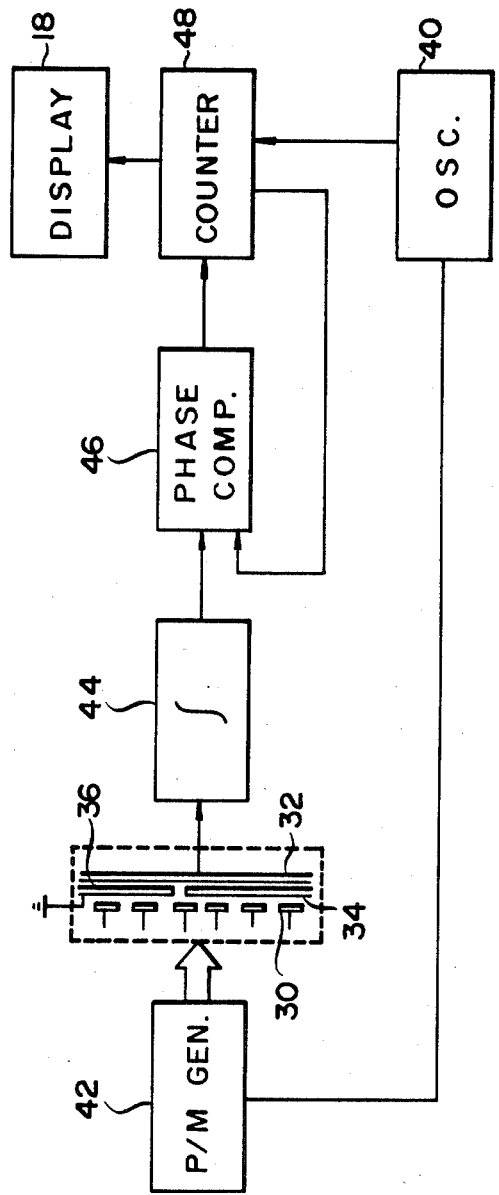
FIG. 3 is a block diagram of an electrical circuit which can be used in the micrometer according to the present invention.

FIG. 3 shows the electrical circuit of the encoder for detecting the displacement of the spindle 14 by the use of said electrodes, which includes an oscillator 40 generating clock pulses at the output, and a pulse modulation generator 42 actuated in synchronism with the clock pulses such that eight different AC voltages being respectively out of phase by 45° will be applied to the respective transmitter electrodes 30. The output signal of the receiver plate 32, which varies depending on the rotation of the rotary plate 24, is supplied to the input of a phase comparator 46 through an integrating circuit 44. In the phase comparator 46, the phase of such an input signal is compared with a reference phase such that the rotational displacement of the rotary plate 24 relative to the stationary plate 22 is detected as if the input signal is out of the reference phase. The detection signal is supplied to the input of a counter circuit 48 which counts clock pulses from the oscillator 40 in response to the supplied detection signal to digitally indicate the displacement of the spindle 14 on the display 18.

The digital display measuring apparatus will operate in the following manner:

When the thimble 16 is manually rotated to move the spindle 14, the rotary plate 24 is synchronistically rotated to change the combination of the receiving electrode 32 with the respective transmitter electrodes 30 which are electrostatically connected with the receiver electrode 32 through the respective coupling electrodes 34.

As described hereinbefore, the stationary plate 22 includes two sets of eight transmitter electrodes 30 to which the voltages being respectively out of phase by 45° are applied. Thus, if the rotary plate 24 is rotated through one complete revolution, the output signal of the receiver electrode 32 will vary in phase by 45°×16=720°. For example, if the spindle 14 has such a pitch that it is displaced by 500 microns when the rotary plate 24 is rotated through one complete revolution, the displacement of the spindle 14 can be detected by 500/720=0.7 microns at each time when the output signal of the receiver electrode 32 varies by one degree.

When the micrometer having a spindle with a feed pitch of 500 microns, the encoder of the present invention is compared with a conventional contact type encoder of two-row or two-brush construction, it is understood that the latter must have a great number of slits formed on the rotary plate, the number n of the slits being n=500/4=125 per one row, that is, per an electric angle of 360°. This construction is very minute and complicated in comparison with the present invention.

In comparison of the present invention with the prior art photoelectricaly type quartered encoder, it is similarly understood that the latter must have a rotary plate provided with many slits formed therein, the number n of which is n=500/4=125 per an electric angle of 360°. This also is very minute and complicated. On the contrary, the present invention provides a very simplified apparatus for detecting the displacement of the spindle 14.

In accordance with the present invention, the stationary plate 22 may include any number of transmitter electrodes 30 arranged thereon and to which AC voltages being respectively out of phase by the corresponding angle.

Although the present invention has been described as to the digital display micrometer, the invention is not limited to such a construction and can be applied to any other digital display type measuring system such as dial gauge, height gauge or the like.

In accordance with the principle of the present invention, merely the transmitter and receiver electrodes 30, 32 on the stationary plate 22 are connected with leads or the like while at the same time the coupling and earthing electrodes 34, 36 on the rotary plate 24 are free. Therefore, all the wirings of the electrical circuit and others can be arranged in the stationary side so that the entire system will be simplied and reduced in size. Since the moving parts such as the rotary plate 24 and others have no electric wiring, the entire system is extremely reliable.

Figure 4:
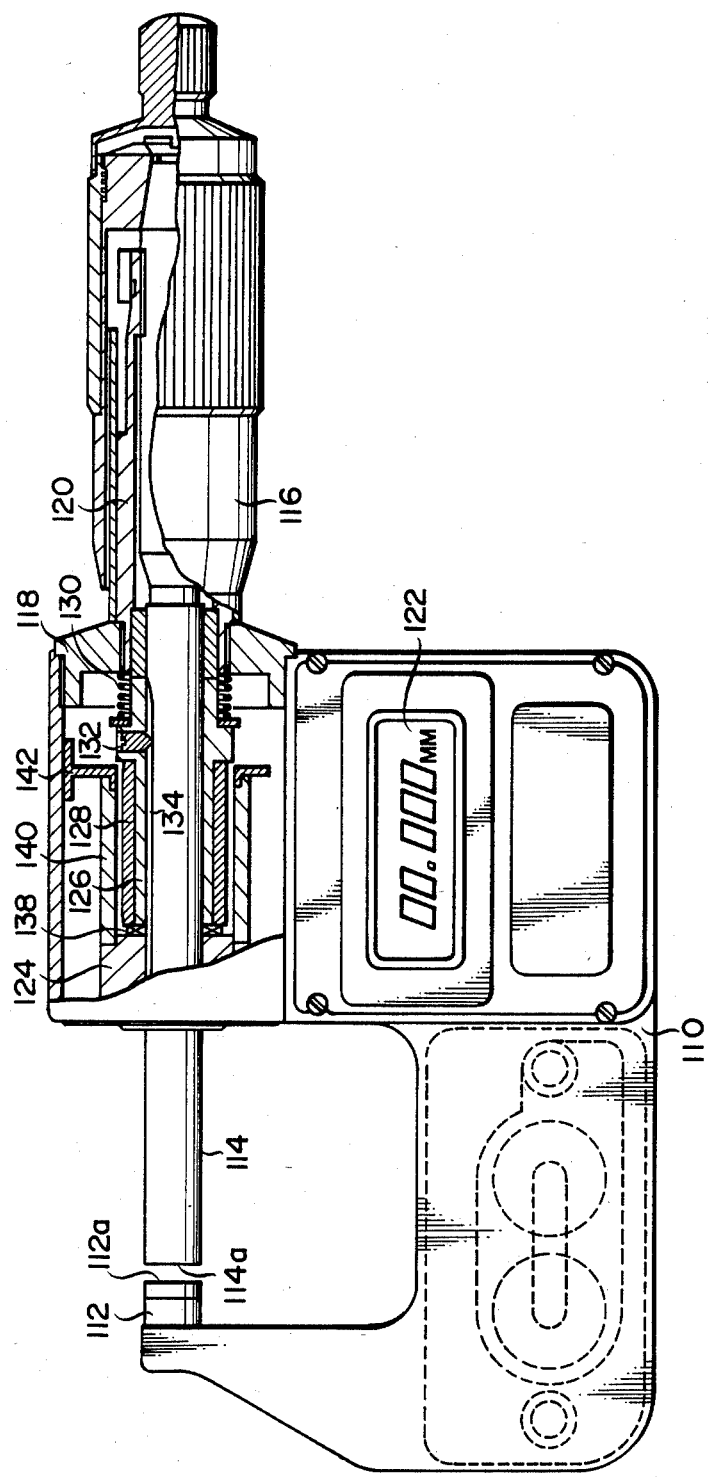
FIG. 4 is a side view showing, partially broken, a digital display micrometer which is another embodiment of the present invention.

FIG. 4 shows a digital display micrometer which is another embodiment of the present invention and which includes a U-shaped frame 110, an anvil 112 mounted on the frame 110 at one leg of the U with the measuring face 112a being faced inwardly, the a spindle 114 mounted on the frame at the other leg with the measuring face 114a being faced to the measuring face 112a of the anvil 112. The spindle 114 is coaxially mounted on a thimble 116 which is manually rotated to move the spindle 114 toward and away from the anvil 112.

The thimble 116 is formed integrally with the spindle 114 and includes an internal thread formed thereon at the internal periphery. This internal thread is screwed onto a sleeve 120 which is stationarily mounted on the frame 110 fitted over the spindle 114 through a holding member 118. Thus, when the thimble 116 is manually rotated, the spindle 114 is correspondingly moved toward and away from the anvil 112.

The displacement of the spindle 114 is detected and converted into an electrical signal pulse by the use of an encoder. The electrical signal is in turn supplied to the input of a counting circuit which is adapted to count the output pulses from the encoder. The counted value is digitally indicated on a display 122 on the side of the frame 110. Thus, the accurate size of an object located between the measuring faces 112a, 114a of the anvil and spindle 112, 114 can digitally be indicated on the display 122.

In accordance with the present invention, the encoder includes a holding cylinder 126 slidably fitted over the spindle 114. A cylindrical rotating member 128 is fixedly fitted around the holding cylinder 126. This holding cylinder 126 is biased axially by means of a spring 130 such that any play will be eliminated in the rotating member 128.

The holding cylinder 126 is mechanically connected with the spindle 114 through a pin 132 which extends inwardly through an opening in the holding cylinder 126 and slidably engages a key groove 134 formed longitudinally on the spindle 114. Thus, the rotation of the spindle 114 causes the rotating member 128 to rotate correspondingly. For smooth rotation of the rotating member 128, the holding cylinder 126 is journalled by a bearing 138 within a base 124 of the machine. On the other hand, the stationary cylinder 140 is fixedly mounted on the base 124.

In other words, the stationary cylinder 140 is fitted around the rotating member 128 and spaced away therefrom. The stationary cylinder 140 is engaged at one end by the base 124 with the other end thereof being fixedly engaged by a holding arm 142 which is fixedly mounted on the wall portion of the base 124.

In the embodiment of FIG. 4, electrode means for detecting the displacement of the spindle 114 is located on the peripheral surfaces of the rotating member 128 and stationary cylinder 140.

Figure 5:
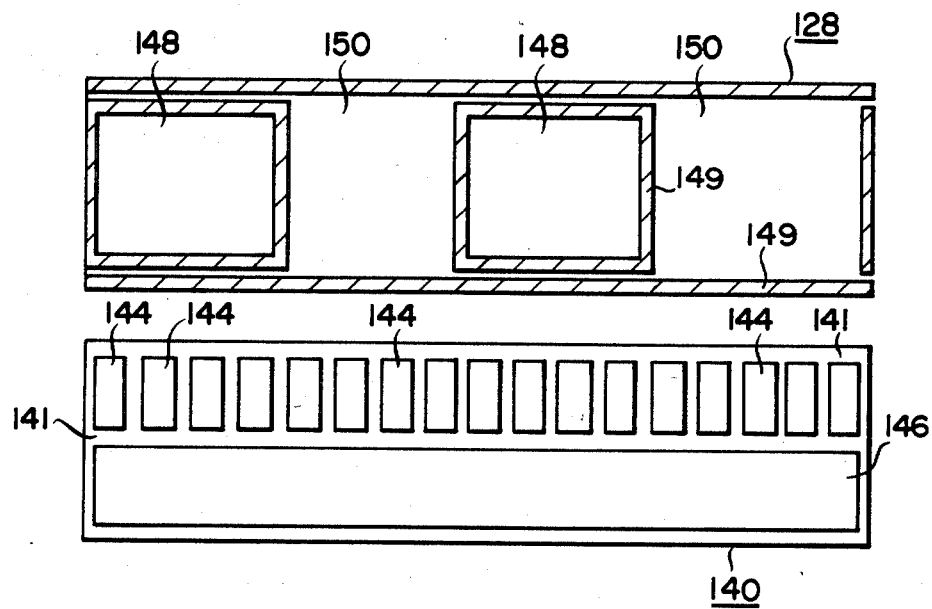

FIG. 5 shows the exploded arrangement of such electrode means on the rotating member 128 and stationary cylinder 140. The stationary cylinder 140 includes a plurality of transmitter electrodes 144 disposed thereon circumferentially at regular intervals through an insulation portion 141, and a ring-shaped receiver electrode 146 located side-by-side relative to the train of the transmitter electrodes. The rotary member 128 includes coupling electrodes 148 disposed thereon through an insulation portion 149 in such a manner that the coupling electrodes straddle and are spaced away from the transmitter and receiver electrodes 144, 146, each of the coupling electrodes electrostatically connecting the receiving electrode 146 with the corresponding transmitter electrodes 144. The rotary member 128 also includes earthing electrodes 150 disposed in the same manner as that of the coupling electrodes 148. The coupling and earthing electrodes are alternately arranged circumferentially on the rotating member 128.

In such an arrangement, if the rotating member 128 is rotated under such a state that rectangular or sinusoidal AC voltages being respectively out of phase are applied to the respective transmitter electrodes 144, the receiver electrode 146 will generate an output signal corresponding to the rotational displacement of the rotating member 128.

Comparing the output signal phase of the receiver electrode 146 with a reference phase, the displacement of the spindle 114 can accurately be measured without influence due to change of power voltage and others.

In the embodiment shown in FIG. 5, the transmitter electrodes 144 includes two groups of eight electrodes on the stationary cylinder 140. The receiver electrode 146 is in the form of a ring-shaped belt disposed parallel to the row of the transmitter electrodes 144. In such an arrangement, AC voltages being respectively out of phase by $360°/8=45°$ are applied to the respective transmitter electrodes in each group. Any number of the transmitter electrodes 144 may be utilized in each group. This arrangement provides two coupling electrodes 148-1, 148-2 and two earthing electrodes 150-1, 150-2 which are alternately arranged circumferentially on the rotating member 128. Each of the coupling and earthing electrodes covers a quarter of the circumference of the stationary cylinder 140, that is, such a range which includes four of the transmitter electrodes 144 and a quarter of the circumference of the receiver electrode 146.

Since the electrodes are disposed on the peripheral surfaces of the rotary and stationary members 128, 140, the entire apparatus can be reduced in size while increasing the entire area of the electrodes. As a result, the measurement can more accurately be carried out than the conventional measuring systems in which a plurality of electrodes are disposed on a circular disc. Furthermore, various parts can be machined in accordance with the shaft base system since the electrodes are arranged circumferentially on the cylindrical members. Consequently, the assembly can more easily be effected while increasing the accuracy of the parts on assembly.

The holding cylinder 126 is biased axially by the action of a spring 130 to eliminate any play in the rotating member 128. As a result, the spacing between the rotating member 128 and the stationary cylinder 140, that is, between the transmitter and receiver electrodes 144, 146 and the coupling electrodes 148 can be maintained constant so that the measurement will be carried out with a higher accuracy.

Figure 6:
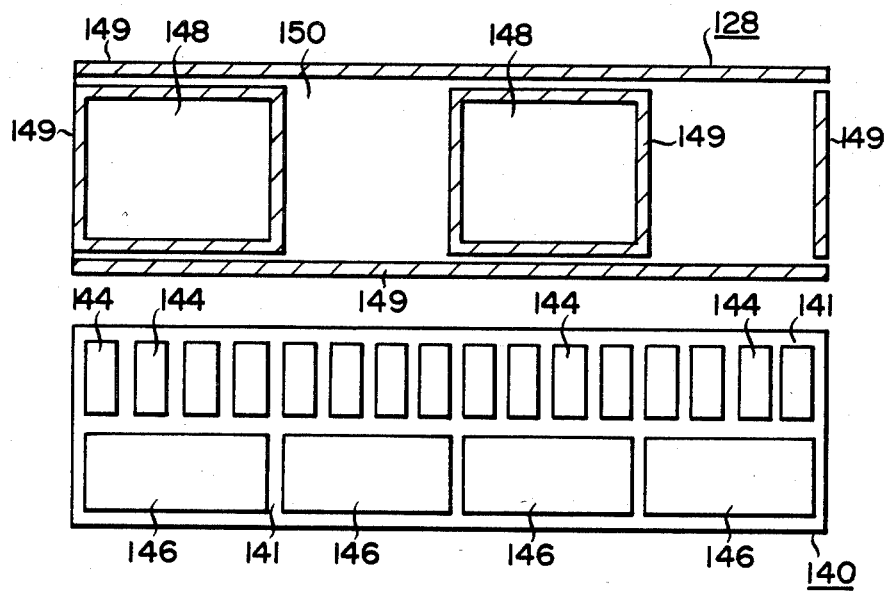
FIG. 6 is an exploded view showing a modification of the arrangement shown in FIG. 5, in which the receiving electrode is in the form of a discontinuous belt.

In still another aspect of the present invention, a plurality of receiver electrodes 146 may be provided on the stationary cylinder 140 as shown in FIG. 6. Each of the receiver electrodes 146 has a length, that is, circumference extent corresponding to the entire circumferential extent of four transmitter electrodes 144.

In a further aspect of the present invention, the rotating member 128 may support the transmitter and receiver electrodes 144, 146 while the stationary cylinder 140 may support the coupling and earthing electrodes 148, 150. By providing the coupling and earthing electrodes 148, 150 on the rotary member 128 and the transmitter and receiver electrodes 144, 146 on the stationary cylinder 140, however, leads or the like can be connected with only the transmitter and receiver electrodes 144, 146 on the stationary cylinder 140 such that all the wirings of the electrical circuit and others will be effected on the stationary side of the system. Therefore, the entire structure can be simplified and reduced in size. Furthermore, the reliability of the entire system can also be increased very much since the moving parts including the rotating member 128 and others have no electrical wiring.

We claim:

1. A digital display measuring apparatus comprising a display, a movable measurement element adapted to engage an object to be measured and an encoder for detecting the displacement of the measuring element and converting it into an electrical output signal which is digitally indicated on said display, the measuring apparatus being characterized in that said encoder comprises a stationary plate on a base of said apparatus, a rotary plate positioned opposed to the stationary plate and adapted to rotate depending on the displacement of the measuring element, a plurality of transmitter electrodes disposed circumferentially on the stationary plate at regular intervals, a ring-shaped receiver electrode located on the stationary plate concentrically with the circular train of the transmitter electrodes, coupling electrodes located on said rotary plate in such a manner that the coupling electrodes straddle and are spaced away from said transmitter and receiver electrodes, said coupling electrodes electrostatically connecting the transmitter and receiver electrodes with each other, and earthing electrodes disposed on the rotary plate in such a manner that the earthing electrodes straddle and are spaced away from the transmitter and receiver electrodes, the coupling and earthing electrodes being alternately disposed circumferentially on the rotary plate, whereby the displacement of said measuring element can be detected in accordance with an output signal of the receiver electrode varied by the rotation of said rotary plate when AC voltages having different phases are applied to the respective transmitter electrodes.

2. A digital display measuring apparatus as defined in claim 1, wherein said stationary plate supports two sets of eight transmitter electrodes and wherein said rotary plate supports two coupling electrodes each of which covers four of said transmitter electrodes on said stationary plate.

3. A digital display micrometer comprising a display, a spindle movable on the micrometer body and adapted to engage an object to be measured, and an encoder for detecting the displacement of the spindle and converting it into an electrical output signal which is digitally indicated on said display, said micrometer being characterized in that said encoder comprises a stationary cylinder on a base of the micrometer, a rotating member fitted to the stationary cylinder and spaced away from the internal or external wall of said stationary cylinder, said rotating member being adapted to rotate in response to the movement of the spindle, a plurality of tramsmitter electrodes located on one of the opposing walls of said stationary cylinder and rotating member and spaced away from one another at regular intervals, a belt-like receiver electrode disposed on said one wall arranged parallel to said transmitter electrodes, coupling electrodes located on the other wall in such a manner that said coupling electrodes straddle and are spaced away from the transmitter and receiver electrode, said coupling electrodes electrostatically connecting said transmitter electrodes with the receiver electrode, and earthing electrodes on the other wall in such a manner that said earthing electrodes straddle and are spaced away from the transmitter and receiver electrodes, said coupling and earthing electrodes being alternately arranged circumferentially on the other wall, whereby the displacement of said spindle can be detected in accordance with the output signal of said receiver electrode varying in response to the rotation of the rotating member when AC voltages having different phases are applied to the respective transmitter electrodes.

4. A digital display micrometer as defined in claim 3, wherein said trasmitter electrodes include two or more units of n transmitter electrodes and wherein said AC voltages applied to said respective transmitter electrodes are respectively out of phase by $360°/n$.

* * * * *